US007793092B2

(12) United States Patent
Toi et al.

(10) Patent No.: US 7,793,092 B2
(45) Date of Patent: Sep. 7, 2010

(54) INFORMATION PROCESSING APPARATUS AND METHOD FOR USING RECONFIGURABLE DEVICE

(75) Inventors: Takao Toi, Tokyo (JP); Tooru Awashima, Tokyo (JP); Hirokazu Kami, Tokyo (JP); Takeshi Inuo, Tokyo (JP); Nobuki Kajihara, Tokyo (JP); Taro Fujii, Kanagawa (JP); Kenichiro Anjo, Kanagawa (JP); Koichiro Furuta, Kanagawa (JP); Masato Motomura, Kanagawa (JP)

(73) Assignees: NEC Corporation, Tokyo (JP); NEC Electronics Corporation, Kanagawa (JP)

( * ) Notice: Subject to any disclaimer, the term of this patent is extended or adjusted under 35 U.S.C. 154(b) by 808 days.

(21) Appl. No.: 11/616,751

(22) Filed: Dec. 27, 2006

(65) Prior Publication Data

US 2007/0150718 A1 Jun. 28, 2007

(30) Foreign Application Priority Data

Dec. 28, 2005 (JP) .............................. 2005-377731

(51) Int. Cl.
*G06F 9/00* (2006.01)
*G06F 1/24* (2006.01)
*G06F 17/50* (2006.01)
*G06F 9/44* (2006.01)

(52) U.S. Cl. ............................ 713/100; 713/1; 716/16; 716/17; 717/104; 717/120

(58) Field of Classification Search ...................... 713/1, 713/100; 716/16, 17; 717/104, 120
See application file for complete search history.

(56) References Cited

U.S. PATENT DOCUMENTS

| 5,734,872 | A | * | 3/1998 | Kelly ............................ 703/20 |
| 5,887,165 | A | * | 3/1999 | Martel et al. ................. 713/100 |
| 6,662,302 | B1 | * | 12/2003 | Garey .......................... 713/324 |
| 7,474,119 | B2 | * | 1/2009 | Kanno et al. ................... 326/38 |
| 2002/0108009 | A1 | * | 8/2002 | Borgatti et al. ............... 710/303 |

FOREIGN PATENT DOCUMENTS

| JP | 200-040745 A | 2/2000 |
| JP | 2000-516418 A | 12/2000 |
| JP | 2003-099409 A | 4/2003 |
| JP | 2004-133780 A | 4/2004 |
| JP | 2004-133781 A | 4/2004 |
| JP | 2005-124130 A | 5/2005 |
| WO | WO 01/90887 A1 | 11/2001 |

OTHER PUBLICATIONS

Toi, Awashima, Wakabayashi, Honmura, "Design tool for dynamic reconfiguration processor only in C language", Nikkei Electronics, Jun. 21, 2004, pp. 131-138.
Ralf Krueger, XCELL Journal, Spring 2005, p. 2.
Philippe Butel, XCELL Journal, Fall 2004, pp. 2-6.

* cited by examiner

*Primary Examiner*—Stefan Stoynov
(74) *Attorney, Agent, or Firm*—Sughrue Mion, PLLC

(57) ABSTRACT

Configuration codes for implementing a plurality of circuits having different attributes are generated and stored in a memory for each task executed in a reconfigurable device. When the reconfigurable device is operated, an appropriate circuit to be executed by the reconfigurable device is selected in accordance with an operation state of the system from among a plurality of circuits having different attributes, and the configuration code for implementing the selected circuit is loaded from the memory into the reconfigurable device.

24 Claims, 3 Drawing Sheets

INFORMATION PROCESSING APPARATUS AND METHOD FOR USING RECONFIGURABLE DEVICE

This application is based upon and claims the benefit of priority from Japanese Patent Application No. 2005-377731 filed on Dec. 28, 2005, the content of which is incorporated by reference.

BACKGROUND OF THE INVENTION

1. Field of the Invention

The present invention relates to an information processing apparatus comprising a reconfigurable device capable of changing the circuits constructed within the reconfigurable device and a method for using the reconfigurable device.

2. Description of the Related Art

In the field of information processing, the application range of information processing apparatus has been extended and the requirement is that these apparatuses have the capability of performing faster arithmetic operations or of handling large amounts of data, such as still images or moving pictures, at high speeds. The means for meeting such requirements are conventionally well known and these comprise a DSP (Digital Signal Processor) or an ASIC (Application Specific Integrated Circuit) for managing a specific arithmetic operation or process separately from the CPU, and improves the processing ability of the information processing apparatus by reducing the processing load of the CPU.

However, in recent years the requirement has been that information processing apparatus have a compression/decompression algorithm or an arithmetic operation algorithm in conformity with various standards for multi-media data such as still images, moving pictures, voice and music, and the information processing apparatuses employ various communication protocols for transmitting or receiving various kinds of data via a network such as the Internet. Further, to deal with the problem of safeguarding information that is transmitted or received on the network, an encryption and a decryption process are needed. Therefore, if a number of DSPs or ASICs are provided in accordance with these processes, the circuit scale or cost of the information processing apparatus will be greatly increased.

Thus, it is well known that information processing apparatuses have a reconfigurable device such as FPGA (Field Programmable Gate Array) or DRP (Dynamically Reconfigurable Processor), and perform the process by rewriting a program within the reconfigurable device, as needed, whereby throughput processing capability of the information processing apparatus is improved to better handle various processing requests with the reduced costs.

The reconfigurable device comprises an internal memory for storing the program (configuration code) inside, in which the configuration code stored in an external memory is loaded into the internal memory under the control of the CPU. And a virtual circuit is constructed internally in accordance with the loaded configuration code, and a predetermined process (hereinafter referred to as a task) is performed for the data inputted by the virtual circuit.

Since the capacity of this internal memory is limited, the circuit scale implemented by the configuration code is also limited. In a case where two or more circuits that have a capacity equal to or more than that of the internal memory are built within the reconfigurable device, the reconfigurable device can not implement these circuits at the same time so that the reconfigurable device is required to perform the task while changing the configuration codes.

Usually, since the size of the configuration code is large, it takes a long time to load it into internal memory. Therefore, in the FPGA, it is proposed that even if a part of the circuit is operating, other circuit formation areas not operating can be changed For this configuration, for example, refer to Virtex2 (P. Butel, G. Habay, A Rachet, "Managing Partial Dynamic Reconfiguration in Virtex-II Pro FPGAs", Xilinx, Inc., [Aug. 15, 2005], or Virtex4 (R. Krueger, "Dynamic Reconfiguration of Functional Blocks" Xilinx, Inc., [Aug. 15, 2005].

Also, in the DRP, even if a part of the circuit is operating, the configuration code for the context not in use can be rewritten from the outside. For example, its method is described in Japanese Patent Application Laid-Open No. 2004-133780 and Japanese Patent Application Laid-Open No. 2004-133781.

Also, as described in Japanese Patent Application Laid-Open No. 2005-124130, to automatically adjust processing time of the reconfigurable device in accordance with the processing capability required for each process, the amount of accumulated input and output data for the reconfigurable device is monitored, and the configuration code is read in accordance with the processing capability of the circuit.

Since the CPU usually inputs and processes instructions and data at the same time, the CPU may be considered to be the reconfigurable device. Japanese Patent Application Laid-Open No. 2000-040745 or Japanese Patent Application Laid-Open No. 2000-516418, for example, propose dynamically rewriting the process (circuit configuration) performed by the CPU, Also, it was offered in International Patent Publication No. 2001/090887 pamphlet to dynamically rewrite the program in accordance with the used cost value.

By the way, in the information processing apparatus, it may not be possible to solve the problem with the system only by implementing the circuit having its physical circuit area or more using the reconfigurable device. For example, it is not necessarily essential for the circuit that the circuit area be small, but high throughput processing capability or low power consumption may be required for data processing.

Also, these requirements that may be required are not absolute, but may be changed in accordance with the operation state of the system, as needed. For example, when the remaining a battery capacity that supplies power to the system is small, or when the ambient temperature of the apparatus rises, it will be necessary to limit power consumption of the circuit.

SUMMARY OF THE INVENTION

Thus, it is an object of the invention to provide an information processing apparatus and a method for using a reconfigurable device in which various requirements such as a smaller circuit area, higher throughput processing capability and lower power consumption can be achieved when using the reconfigurable device.

In order to accomplish the above object, in the present invention, the configuration codes for implementing a plurality of circuits having different attributes are generated and stored in a configuration code memory for each task executed by the reconfigurable device. Though these circuits are the circuits that do the same operation (same task), they have attributes of a smaller circuit area, higher throughput processing capability or lower power consumption, etc.

And when the reconfigurable device performs the processing, an appropriate circuit that is executed by the reconfigurable device is selected according to the operational state of the system from among a plurality of circuits having different attributes, and the configuration code that implements the selected circuit is loaded from memory into the reconfigurable device.

The reconfigurable device starts a process for the inputting data by implementing the circuit that corresponds to the loaded code after loading of the configuration code has been completed.

In the above information processing apparatus, since the circuits constructed within the reconfigurable device can be appropriately switched in accordance with the operation state of the system, various requirements such as a smaller circuit area, higher throughput processing capability and lower power consumption for the circuit constructed within the reconfigurable device can be achieved.

The above and other objects, features, and advantages of the present invention will become apparent from the following description with reference to the accompanying drawings, which illustrate examples of the present invention.

DETAILED DESCRIPTION OF THE PREFERRED EMBODIMENT

The present invention will be described below with reference to the drawings.

Figure 1:
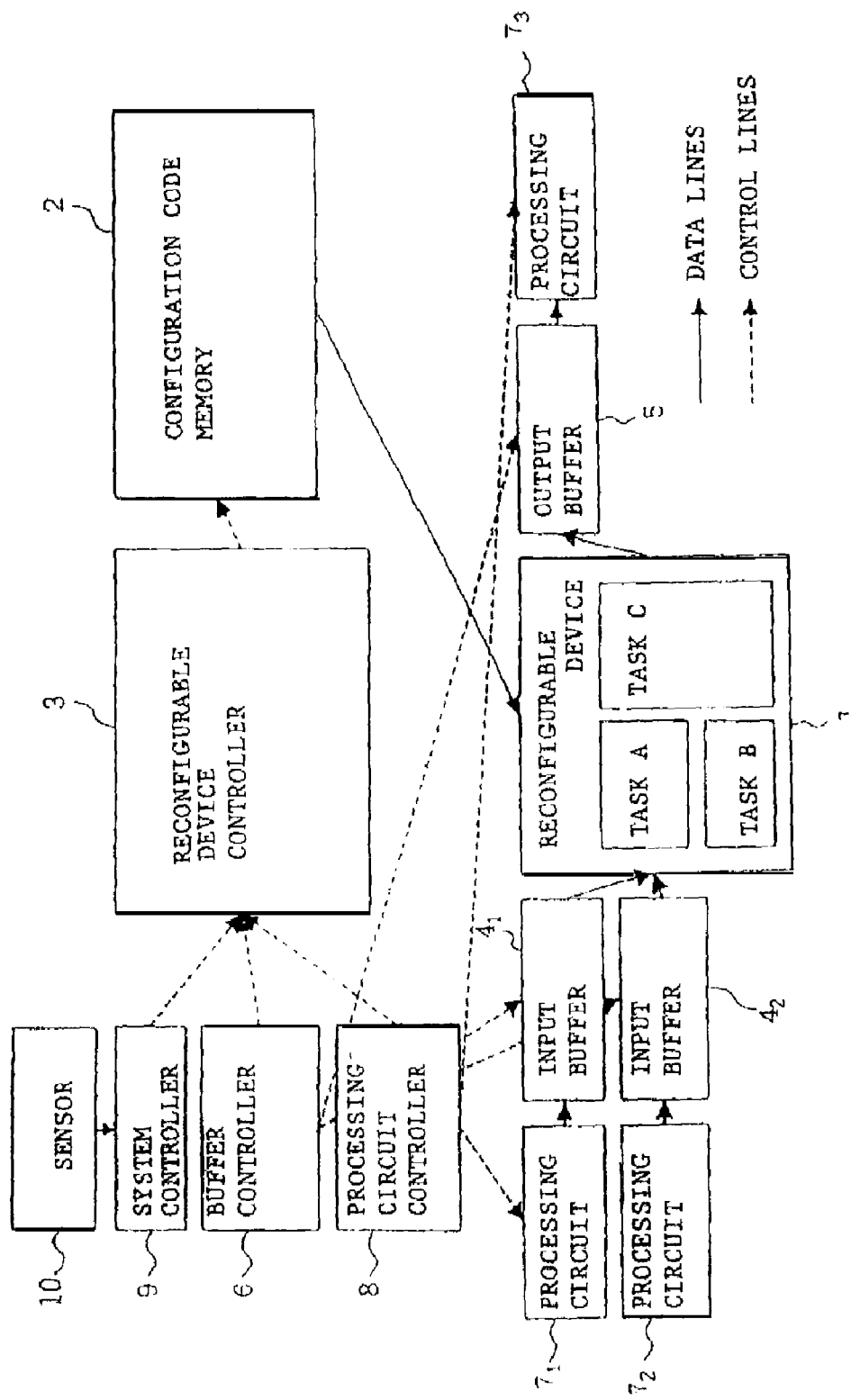
FIG. 1 is a block diagram showing one configuration example of an information processing apparatus according to the present invention.

An information processing apparatus of the present invention comprises reconfigurable device 1 that implements a circuit for executing a desired process (task) in accordance with a configuration code such as an FPGA or a DRP, configuration code memory 2 that stores the configuration code used by reconfigurable device 1, reconfigurable device controller 3 that controls the operation of reconfigurable device 1 and the loading of the configuration code into reconfigurable device 1, input buffer 4 (input buffer $4_1$ and $4_2$ in FIG. 1) that temporarily holds the data to be processed (input data) that is supplied to reconfigurable device 1, output buffer 5 that temporarily holds the processed data (output data) that is outputted from reconfigurable device 1, buffer controller 6 that controls the operation of input buffer 4 and output buffer 5, a plurality of processing circuits 7 (processing circuits $7_1$ to $7_3$ in FIG. 1) that perform desired processing on the input data supplied to reconfigurable device 1 or the output data processed by reconfigurable device 1, processing circuit controller 8 that controls the operation of processing circuits 7, system controller 9 that controls the operation of the entire information processing apparatus, and sensor 10 that senses the temperature of the information processing apparatus or the remaining battery capacity, as shown in FIG. 1

Buffer controller 6, processing circuits 7 and processing circuit controller 8 may be realized using a logical circuit or a memory, for example, or may be configured to comprise a CPU (or a DSP) and a recording medium and perform various processes with the CPU (or DSP) in accordance with a program stored in the recording medium.

System controller 9 is configured using the CPU or DSP or the other processing apparatus to enable processing or control of the entire information processing apparatus.

Reconfigurable device controller 3, buffer controller 6 and processing circuit controller 8 are not necessarily provided. For example, when system controller 9 is constituted by the CPU operating in accordance with the program, the functions of these units may be implemented by system controller 9. In this case, the functions of reconfigurable device controller 3, buffer controller 6, processing circuit controller 8 and system controller 9 may be implemented by one CPU, or by a plurality of CPUs.

While processing circuits 7 perform desired processes for the input data supplied to reconfigurable device 1 and for the output data processed by reconfigurable device 1 in FIG. 1, these processes may be performed by system controller 9, for example. In this case, processing circuits 7 are disposed with.

Also, two input buffers $4_1$ and $4_2$, one output buffer 5 and three processing circuits $7_1$, $7_2$ and $7_3$ are provided in FIG. 1, but the number of buffers or circuits depends on the capacity of the internal memory or the processing capability or the configuration of reconfigurable device 1, and may be arbitrarily provided.

Sensor 10 senses a rise in temperature within the apparatus or a state where the remaining battery capacity is small. If the rise in temperature or the state where the remaining battery capacity is small is sensed by sensor 10, the circuit within configuration device 1 is switched to a circuit for reducing power consumption, as will be described later. If the switching of circuits is unnecessary, sensor 10 is dispensed with.

Moreover, while reconfigurable device 1, configuration code memory 2, reconfigurable device controller 3, input buffer 4, output buffer 5, buffer controller 6, processing circuit 7, processing circuit controller 8 and system controller 9 are independently provided in FIG. 1, all these units may be formed on one chip, or two or more units may be formed on one chip.

In the information processing apparatus as shown in FIG. 1, tasks A, B and C performed by reconfigurable device 1 are set up, and the configuration codes of a plurality of circuits for implementing desired requirements are generated for each task. Herein, the "requirement item" (hereinafter referred to as attribute) may be conceived as a small circuit area, high throughput processing capability or small power consumption.

The configuration code is generated beforehand using a well-known synthesis tool, and stored in configuration code memory 2. The synthesis tool comprises an operation synthesis tool, a technology mapping tool, a place and route tool, and a code generation tool, for example, as shown in FIG. 2.

The operation synthesis tool divides a series of processes represented in the operation description and created by the designer into a control circuit and a data path circuit to generate their intermediate code. The technology mapping tool and the place and route tool execute a process for mounting the circuit elements represented in the intermediate code outputted from the operation synthesis tool and for mounting the wiring to connect them within reconfigurable device. The code generation tool converts the circuit (program) generated by the technology mapping tool and the place and route tool into configuration code. Such a synthesis tool is described in detail in Toi, Awashima, Wakabayashi, Honmura, "Design tool for dynamic reconfiguration processor only in C language", Nikkei Electronics, Jun. 21, 2004, pp. 131-138.

Figure 2:
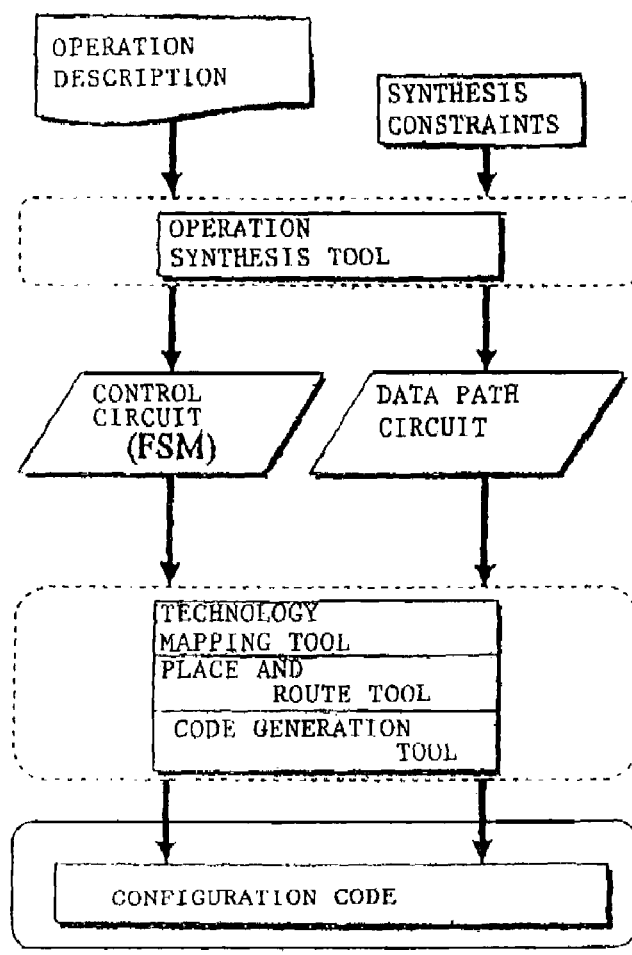
FIG. 2 is a flowchart showing a procedure for compiling configuration code, including one configuration example of a synthesis tool that is used to generate the configuration code.

In the recent synthesis tool, a large scale circuit constructed within reconfigurable device can be designed by using a high order language such as C, C++ or Java, or by a hardware description language such as Verilog or VHDL (an instance of using C language is shown in FIG. 2).

A plurality of configuration codes generated for each task can be generated by setting limiting conditions (synthesis constraints) such as throughput processing capability, circuit area or power consumption for the operation synthesis tool. In this case, various circuits having different attributes but executing the same task (e.g., circuits having different throughput processing capability per unit area) can be easily generated (e.g., refer to Japanese Patent Application Laid-Open No. 2003-99409).

A plurality of configuration codes generated for each task may be generated by using the same source code, or generated by using different source codes and different algorithms.

In the present invention, when the task of reconfigurable device 1 is executed, an appropriate circuit is selected in accordance with an operational state of the system under the control of reconfigurable device controller 3, and the configuration code that corresponds to the selected circuit is loaded from configuration code memory 2 into the internal memory of reconfigurable device 1, whereby the circuits are appropriately switched.

Reconfigurable device 1 starts a process for inputting data by implementing the circuit realized by the code after loading of configuration code has been completed. The configuration code may rewrite all contents of the internal memory depending on its size (equivalent to the circuit area), or may be loaded in a circuit formation area (containing a context) of the internal memory currently not in use.

A method for selecting the circuit by reconfigurable device controller 3 involves selecting the circuit in accordance with the priority of the task that is determined by the attribute for each task or by the intrinsic information required for each task, which is obtained from system controller 9. This intrinsic information includes information as to whether high throughput processing capability is required for the task, whether a preferential process is required, and whether the processing order of tasks is specified.

For example, when a request is made to give preference to a task that is to be processed over a task that is being current executed, the task that is being executed is interrupted at the point when loading of the configuration code for the task that has higher priority (the circuit that attributes high throughput processing capability) is completed, and the task having higher priority is then executed. If high throughput processing capability is not required for the task having higher priority, the circuit having the attribute of a small area may be selected for the task that has higher priority, and the currently executed task and the task having higher priority may be processed in parallel. When a task having dependency on input data and output data is requested, such as when the output data of a reconfigurable device is further processed by the reconfigurable device, the task is not processed in parallel by a plurality of circuits, but is executed by selecting the circuit having higher throughput processing capability.

Another method for selecting the circuit by reconfigurable device controller 3 involves selecting a circuit that attributes high throughput processing capability in accordance with the processing capability of reconfigurable device 1 by using information about the amount of data held in input buffer 4 and output buffer 5 that are managed by buffer controller 6.

For example, if there is a possibility that the amount of data held in input buffer 4 exceeds the buffer capacity (the data amount exceeds a predetermined threshold), a circuit that attributes high throughput processing capability is selected. Also, if there is a possibility that the amount of data held in output buffer 5 exceeds the buffer capacity (the data amount exceeds a predetermined threshold), the circuit that has the attribute of a small area (in general, a circuit having a small area has a large delay amount) is selected.

Moreover, another method for selecting the circuit with reconfigurable device controller 3 involves selecting the circuit that attributes low power consumption in accordance with an instruction issued from system controller 9 based on information detected by sensor 10.

For example, in the case where sensor 10 is a temperature sensor, when the temperature within the apparatus approaches the upper limit of its permissible range (a predetermined threshold value is exceeded), the circuit that attributes low power consumption is selected. Also, in the case where sensor 10 is a remaining amount sensor for sensing the remaining battery capacity, the circuit that attributes low power consumption is selected when the remaining the battery capacity is less than a predetermined threshold value.

The method for selecting the circuit by reconfigurable device controller 3 may be obtained by appropriately combining the method for selecting the circuit in accordance with the preset priority for each task, the attribute for each task or the intrinsic information for each task, the method for selecting the circuit having the attribute of high throughput processing capability, in accordance with the processing capability of reconfigurable device 1, and the method for selecting the circuit that attributes low power consumption based on the information detected by sensor 10.

In the present invention, the configuration codes for implementing a plurality of circuits having different attributes are generated beforehand for each task executed by reconfigurable device 1, and stored in configuration code memory 2, an appropriate circuit executed by reconfigurable device 1 is selected in accordance with the operational state of the system from among a plurality of circuits having different attributes, and the configuration code corresponding to the selected circuit is loaded from configuration code memory 2 into reconfigurable device 1, whereby the circuits implemented by the reconfigurable device can be appropriately switched in accordance with the operational state of the system. Accordingly, various requirements for the circuit constructed within reconfigurable device 1 such as smaller circuit area, higher throughput processing capability or lower power consumption can be realized.

Figure 3:
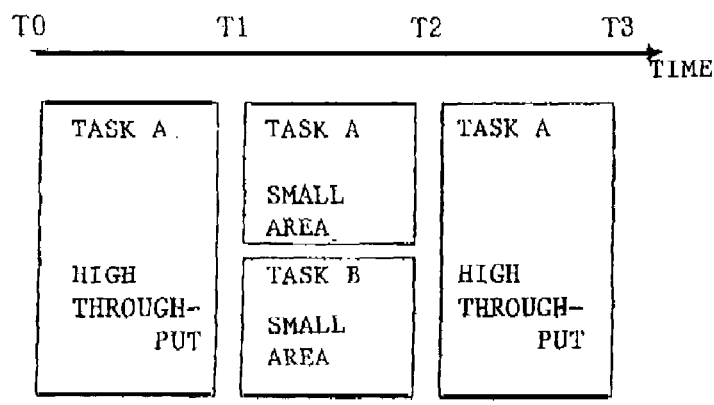
FIG. 3 is a view showing a method for using the reconfigurable device as shown in FIG. 1, of a timing chart showing the temporal transition of tasks processed in the reconfigurable device.
Figure 4:
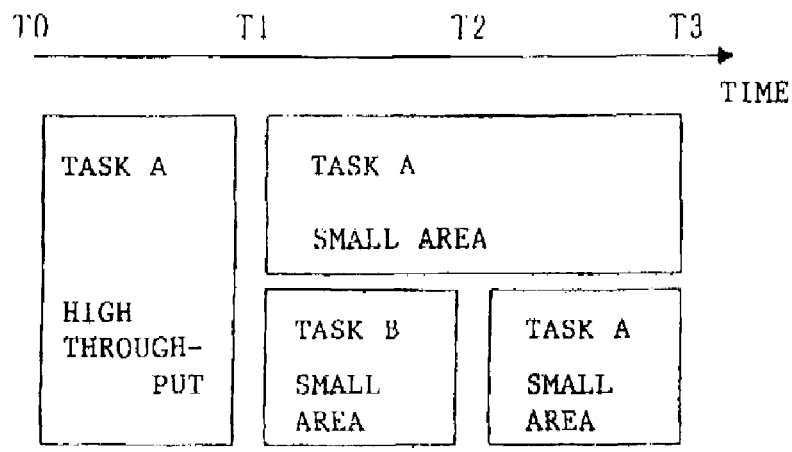
FIG. 4 is a view showing a method for using the reconfigurable device as shown in FIG. 1, or a timing chart showing the temporal transition of tasks processed in the reconfigurable device.
Figure 5:
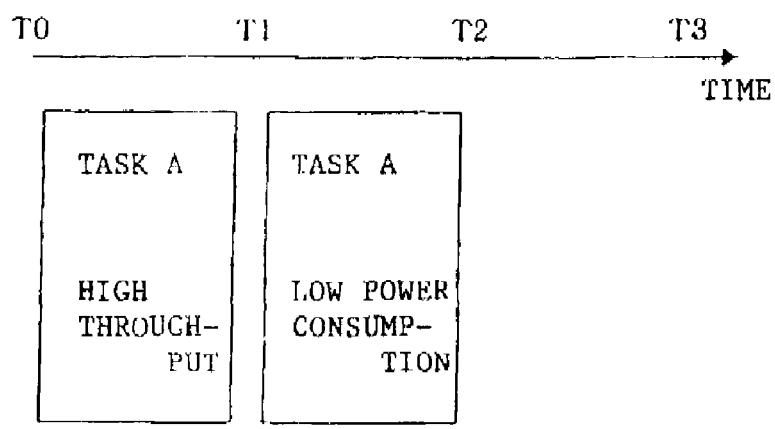
FIG. 5 is a view showing a method for using the reconfigurable device as shown in FIG. 1, or a timing chart showing the temporal transition of tasks processed in the reconfigurable device.

Referring to FIGS. 3 to 5, a method for using reconfigurable device according to the present invention will be described below.

FIG. 3 shows an example in which the configuration code of task A having the attribute of high throughput processing capability is first loaded into reconfigurable device 1 to execute task A from time T0, then the configuration code of task A having the attribute of small circuit area and the configuration code of task B having the attribute of small circuit area are loaded into reconfigurable device 1 to execute task A and task B in parallel with two circuits having the attribute of small circuit area from time T1, and the configuration code of task A having the attribute of high throughput processing capability is loaded last into reconfigurable device 1 to execute task A by implementing the circuit having the attribute of high throughput processing capability from time T2.

FIG. 4 shows an example in which the configuration code of task A having the attribute of high throughput processing capability is first loaded into reconfigurable device 1 to execute task A from time T0, then the configuration code of task A having the attribute of small circuit area and the configuration code of task 8 having the attribute of small circuit area are loaded into reconfigurable device 1 to execute task A and task B in parallel from time T1, and the configuration code of task A having the attribute of small circuit area is loaded last into another context of reconfigurable device 1 to execute task A by implementing two circuits having the attribute of small circuit area in parallel from time T2.

Also, FIG. 5 shows an example in which the configuration code of task A having the attribute of high throughput processing capability is first loaded into reconfigurable device 1 to execute task A with the circuit having the attribute of high throughput processing capability from time T0, and the configuration code of task A having the attribute of low power consumption is loaded into reconfigurable device 1 to execute task A with the circuit having the attribute of low power consumption from time T1.

FIG. 3 shows an application example of reconfigurable device 1 when performance is given to the execution of task B over task A in accordance with a request from processing circuit controller 8 or from buffer controller 6. Herein, since high throughput processing capability is not required for executing the process of task B, task B is executed in the circuit having the attribute of small circuit area from time T1. In this case, since the circuit area constructed by reconfigurable device 1 has an allowance, task A is executed in the circuit having the attribute of small circuit area in parallel with task B from time T1.

In FIG. 3, task A is executed again using the circuit having the attribute of high throughput processing capability at the time when task B is completed. Such a procedure is effective in the case where task A can not be executed by a plurality of circuits in parallel because there is dependency between input data and output data of task A.

In FIG. 4, when task B is ended, tasks A are executed in parallel using two circuits having the attribute of small circuit area. In this case, unlike the method that is uses, as shown in FIG. 3, it is not necessary to again load the configuration code for task A that attributes high throughput processing capability. Accordingly, the throughput processing capability of the information processing apparatus is improved by the amount of time required to load the configuration code for task A having the attribute of high throughput processing capability. Also, if the re-execution of task B is foreseen, any one of two circuits that attribute a small circuit area and that are used to execute task A may be rewritten with the circuit used to execute task B, whereby the amount of time that is required to load the configuration code can be reduced to a minimum.

FIG. 5 shows an application example of a reconfigurable device when a request for reducing the power consumption of reconfigurable device 1 is issued from system controller 9.

For example, when sensor 10 provided for the information processing apparatus senses that the temperature within the apparatus approaches an upper limit in the permissible temperature range, or senses that the remaining battery capacity is small in the system as shown in FIG. 1, that is applied to the portable apparatus, it is expected that such request will be issued. In this case, the circuit that attributes high throughput processing capability may be switched into the circuit that attributes low power consumption to continue task A.

If the circuits are switched in the above manner, the system can be operated at low power consumption without stopping the processing of task A until operation of the system at low power consumption is no longer required because the temperature will have fallen or the remaining battery capacity will have been restored.

When system controller 9 is implemented by the CPU, the power consumption of the CPU is usually proportional to the operation frequency. That is, the operation frequency may be decreased to suppress the power consumption of the CPU. On the other hand, reconfigurable device 1 can synthesize a circuit in which power consumption per unit throughput processing capability is small or a circuit in which power consumption per unit area is small, whereby power consumption can be reduced without greatly decreasing the throughput processing capability. Accordingly, if reconfigurable device 1 employs both the method for changing to the circuit that attributes low power consumption and the method for decreasing the operation frequency of the CPU, power consumption of the entire information processing apparatus will be further reduced.

In a multi CPU system having a plurality of CPUs, if each CPU operates at optimum performance, the throughput processing capability of the entire apparatus will be directly proportional to the number (area) of CPUs. That is, if more CPUs are allocated to executing the task, the throughput processing capability of the system will be increased proportionally. However, in an actual multi CPU system, the throughput processing capability is saturated as the number of CPUs is increased. This is because the standby time for executing tasks is increased because of conflicts over access to memory or conflicts over access to a bus that is shared among the CPUs, saturation of the band that is capable of transmission via the bus, and conflicts over access to other shared resources.

On the other hand, a circuit formed within reconfigurable device 1 can be implemented in a smaller processing unit than the CPU, and a plurality of circuits having the same function can be constructed. In this case, since the plurality of circuits can be executed in parallel, the throughput processing capability directly proportional to the circuit area is fundamentally obtained. Further, if the algorithm is appropriately selected, the throughput processing capability may be further increased more than the increased circuit area. For example, in a case where a two-dimensional FIR filter circuit is realized by using a reconfigurable device, the algorithm is different from the structure used for expanding the loop in the x direction and from the structure used for expanding the loop in the x and y directions in the pipeline process. In this case, the throughput processing capability is not directly proportional to the circuit area, and the structure used for expanding the loop in the x and y directions has a higher throughput processing capability per unit area.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus comprising:
    a reconfigurable device that can implement changes in a circuit for executing a desired task according to a configuration code;
    a configuration code memory that stores the configuration codes for implementing a plurality of circuits having different attributes for each task executed in said reconfigurable device; and a reconfigurable device controller that controls the loading of said configuration code into said reconfigurable device to select an appropriate circuit that is executed from among said plurality of circuits having different attributes by said reconfigurable device according to an operational state of the system, wherein a first set of configuration codes corresponding to a first circuit of the plurality of circuits is loaded into said reconfigurable device and the first circuit executes a first task, and a second set of configuration codes corresponding to a second circuit of the plurality of circuits is dynamically loaded while the first circuit executes the first task and the second circuit executes a second task in parallel with the first circuit.

2. The information processing apparatus according to claim 1, wherein said attribute is a small circuit area.

3. The information processing apparatus according to claim 2, wherein said reconfigurable device controller selects a circuit whose attribute is a small circuit area as the circuit executed by said reconfigurable device in accordance with the priority of the task determined on the bases of the characteristic of each task and on the basis of the intrinsic information required for each task.

4. The information processing apparatus according to claim 2, further comprising an output buffer for temporarily holding the output data that is the processed data after processing by the reconfigurable device, wherein said reconfigurable device controller selects a circuit having the attribute of small circuit area as the circuit executed by said reconfigurable device when the amount of data held in said output buffer exceeds a predetermined threshold value.

5. The information processing apparatus according to claim 2, wherein said reconfigurable device controller controls said reconfigurable device to execute a plurality of tasks in parallel by loading the configuration codes for implementing the circuits having the attribute of small circuit area generated corresponding to a same task into a plurality of circuit formation areas provided for said reconfigurable device.

6. The information processing apparatus according to claim 1, wherein said attribute is high throughput processing capability.

7. The information processing apparatus according to claim 6, wherein said reconfigurable device controller selects a circuit having the attribute of high throughput processing capability as the circuit executed by said reconfigurable device in accordance with the priority of the task determined on the bases of the characteristic of each task and on the basis of the intrinsic information required for each task.

8. The information processing apparatus according to claim 6, further comprising an input buffer for temporarily holding the input data that is the data to be processed that is supplied to the reconfigurable device, wherein said reconfigurable device controller selects a circuit having the attribute of high throughput processing capability as the circuit executed by said reconfigurable device when the amount of data held in said input buffer exceeds a predetermined threshold value.

9. The information processing apparatus according to claim 1, wherein said attribute is low power consumption.

10. The information processing apparatus according to claim 9, further comprising a temperature sensor for sensing the ambient temperature, wherein said reconfigurable device controller selects a circuit having the attribute of low power consumption as the circuit executed by said reconfigurable device when the temperature sensed by said temperature sensor exceeds a predetermined threshold value.

11. The information processing apparatus according to claim 9, further comprising a remaining amount sensor for sensing the remaining battery capacity, wherein said reconfigurable device controller selects a circuit having the attribute of low power consumption as the circuit executed by said reconfigurable device when the remaining battery capacity sensed by said remaining amount sensor is less than a predetermined threshold value.

12. The information processing apparatus according to claim 9, further comprising a system controller having a CPU for controlling the operation of the entire information processing apparatus, wherein said system controller decreases the operation frequency of said CPU when said reconfigurable device controller selects a circuit having the attribute of low power consumption as the circuit executed by said reconfigurable device.

13. A method for using a reconfigurable device that can implement changes in a circuit for executing a desired task according to a configuration code, comprising:

generating and storing in memory the configuration codes for implementing a plurality of circuits having different attributes for each task executed by said reconfigurable device in advance;

selecting an appropriate circuit that is executed from among said plurality of circuits having different attributes by said reconfigurable device according to an operational state of the system, and loading the configuration code corresponding to said selected circuit from said memory into said reconfigurable device; and starting a processing by said reconfigurable device for the input data using the selected circuit at a stage after loading of said configuration code has been completed, wherein a first set of configuration codes corresponding to a first circuit of the plurality of circuits is loaded into said reconfigurable device and the first circuit executes a first task, and a second set of configuration codes corresponding to a second circuit of the plurality of circuits is dynamically loaded while the first circuit executes the first task and the second circuit executes a second task in parallel with the first circuit.

14. The method for using said reconfigurable device according to claim 13, wherein said attribute is a small circuit area.

15. The method for using said reconfigurable device according to claim 14, further comprising selecting a circuit having the attribute of small circuit area as the circuit executed by said reconfigurable device in accordance with the priority of the task determined on the bases of the characteristic of each task and on the basis of the intrinsic information required for each task.

16. The method for using said reconfigurable device according to claim 14, further comprising selecting a circuit having the attribute of small circuit area as the circuit executed by said reconfigurable device when the amount of data held in an output buffer, for temporarily holding the output data that is the processed data after processing by said reconfigurable device, exceeds a predetermined threshold value.

17. The method for using said reconfigurable device according to claim 14, further comprising loading the configuration codes for implementing the circuits, having the attribute of small area generated corresponding to a same task, into a plurality of circuit formation areas provided for said reconfigurable device, and enabling said reconfigurable device to execute a plurality of tasks in parallel.

18. The method for using said reconfigurable device according to claim 13, wherein said attribute is high throughput processing capability.

19. The method for using said reconfigurable device according to claim 18, further comprising selecting a circuit having the attribute of high throughput processing capability as the circuit executed by said reconfigurable device in accordance with the priority of the task determined on the bases of the characteristic of each task and on the basis of the intrinsic information required for each task.

20. The method for using said reconfigurable device according to claim 18, further comprising selecting a circuit having the attribute of high throughput processing capability as the circuit executed by said reconfigurable device when the amount of data held in an input buffer for temporarily holding the input data that is the data to be processed that is supplied to the reconfigurable device exceeds a predetermined threshold value.

21. The method for using said reconfigurable device according to claim 13, wherein said attribute is low power consumption.

22. The method for using said reconfigurable device according to claim 21, further comprising selecting a circuit having the attribute of low power consumption as the circuit executed by said reconfigurable device when the temperature sensed by a temperature sensor for sensing the ambient temperature exceeds a predetermined threshold value.

23. The method for using said reconfigurable device according to claim 21, further comprising selecting a circuit having the attribute of low power consumption as the circuit executed by said reconfigurable device when the remaining battery capacity sensed by a remaining amount sensor for sensing the remaining battery capacity is less than a predetermined threshold value.

24. The method for using said reconfigurable device according to claim 21, further comprising a system controller having a CPU for controlling the operation of the entire information processing apparatus, wherein said system controller decreases the operation frequency of said CPU when said reconfigurable device controller selects a circuit having the attribute of low power consumption as the circuit executed by said reconfigurable device.

* * * * *

UNITED STATES PATENT AND TRADEMARK OFFICE
CERTIFICATE OF CORRECTION

PATENT NO.        : 7,793,092 B2
APPLICATION NO. : 11/616751
DATED             : September 7, 2010
INVENTOR(S)       : Takao Toi et al.

It is certified that error appears in the above-identified patent and that said Letters Patent is hereby corrected as shown below:

In The Specifications:

Column 3, Line 30: after "FIG. 1," delete "of" and insert -- or --

Column 7, Line 9: delete "8" and insert -- B --

Signed and Sealed this

Fourteenth Day of December, 2010

David J. Kappos
*Director of the United States Patent and Trademark Office*